(12) United States Patent
Sluka et al.

(10) Patent No.: US 7,047,931 B2
(45) Date of Patent: May 23, 2006

(54) CONTROL DEVICE FOR AT LEAST ONE CONSUMER, SUCH AS A CAMSHAFT ADJUSTER, AUTOMATIC TRANSMISSION AND THE LIKE, OF MOTOR VEHICLES

(75) Inventors: Gerold Sluka, Nurtingen (DE); Andreas Knecht, Kusterdingen (DE); Michael Jubelt, Ostfildern (DE); Roland Meyer, Nurtingen (DE); Ulf Polzin, Leinfelden (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/249,458

(22) Filed: Apr. 11, 2003

(65) Prior Publication Data

US 2005/0072397 A1 Apr. 7, 2005

(30) Foreign Application Priority Data

Apr. 13, 2002 (DE) ................................. 10216352

(51) Int. Cl.
*F02B 77/00* (2006.01)
(52) U.S. Cl. ............................. 123/198 C; 123/196 R; 123/196 S; 417/318; 184/6.3
(58) Field of Classification Search ............ 123/198 C, 123/196 R, 497, 196 S; 184/6.3, 6.4; 417/318, 417/374

See application file for complete search history.

(56) References Cited

U.S. PATENT DOCUMENTS

| 2,393,833 | A | * | 1/1946 | Steiner | 184/6.3 |
| 4,112,910 | A | * | 9/1978 | Percy | 123/196 S |
| 4,840,543 | A | * | 6/1989 | Geberth, Jr. | 417/223 |
| 4,875,551 | A | * | 10/1989 | Lulich | 184/6.3 |
| 4,940,114 | A | * | 7/1990 | Albrecht | 184/6.3 |
| 6,053,136 | A | | 4/2000 | Albanello et al. | 123/90.16 |
| 6,148,789 | A | | 11/2000 | Johns | 123/196 S |
| 6,386,170 | B1 | | 5/2002 | Iwano et al. | 123/196 R |
| 6,655,342 | B1 | * | 12/2003 | Wendels et al. | 123/196 R |
| 6,871,620 | B1 | | 3/2005 | Almone | 123/90.17 |

FOREIGN PATENT DOCUMENTS

FR 874 863 8/1942

\* cited by examiner

*Primary Examiner*—Mahmoud Gimie
*Assistant Examiner*—Katrina B Harris
(74) *Attorney, Agent, or Firm*—Gudrun E. Huckett (57) ABSTRACT

A control device for at least one consumer of a motor vehicle, having an engine and at least one pump for supplying a medium via at least one pressure line to the at least one consumer, is configured to supply the medium to the at least one consumer before the engine is started. The pump can be driven by an electric motor or by the engine of the motor vehicle or alternatingly by the electric motor and the engine.

3 Claims, 8 Drawing Sheets

CONTROL DEVICE FOR AT LEAST ONE CONSUMER, SUCH AS A CAMSHAFT ADJUSTER, AUTOMATIC TRANSMISSION AND THE LIKE, OF MOTOR VEHICLES

BACKGROUND OF INVENTION

1. Field of the Invention

The invention relates to a control device for at least one consumer, such as a camshaft adjuster, automatic transmission and the like, of vehicles, preferably motor vehicles that have an engine and are provided with at least one pump for supplying a medium, preferably oil, via at least one pressure line to the consumer.

2. Description of the Related Art

In internal combustion engines of motor vehicles, it is known to begin operating the oil pump when starting up the engine. The oil pump is connected to the crankshaft and conveys the oil as a function of the engine speed of the crankshaft. The oil is used, for example, to lubricate the camshaft adjuster or its camshaft. At the time of starting the engine, the oil supply to the camshaft adjuster is still insufficient. Problems occur moreover when the engine is at operating temperature and is idling. When the engine idles, the speed of the crankshaft and thus the speed of the oil pump are reduced so that the output flow can be unsatisfactory with respect to a sufficient supply of oil to the camshaft adjuster.

SUMMARY OF INVENTION

It is an object of the present invention to configure the control device of the aforementioned kind such that during starting of the engine as well as during idling of the engine at operating temperature an optimal supply of medium to the consumer is ensured.

In accordance with the present invention, this is achieved in that the control device supplies oil to the consumer before the engine is started.

In the control device according to the invention, the consumer, such as a camshaft adjuster, is already supplied with a sufficient amount of medium, preferably oil, when the engine has not yet been started. Before staring the engine, oil is already supplied to the consumer so that, when the engine is started, the consumer is supplied with satisfactory amounts of medium. When the consumer is a camshaft adjuster, it is possible, by means of the control device according to the invention, to move the camshaft into its exact starting position by supplying the medium if, at the time of turning off the engine, the camshaft had not yet reached its optimal starting position.

DETAILED DESCRIPTION

The control devices described in the following make it possible to ensure an optimal oil supply of the camshaft adjuster when starting an engine and during the warm-up phase of an engine.

Figure 1:
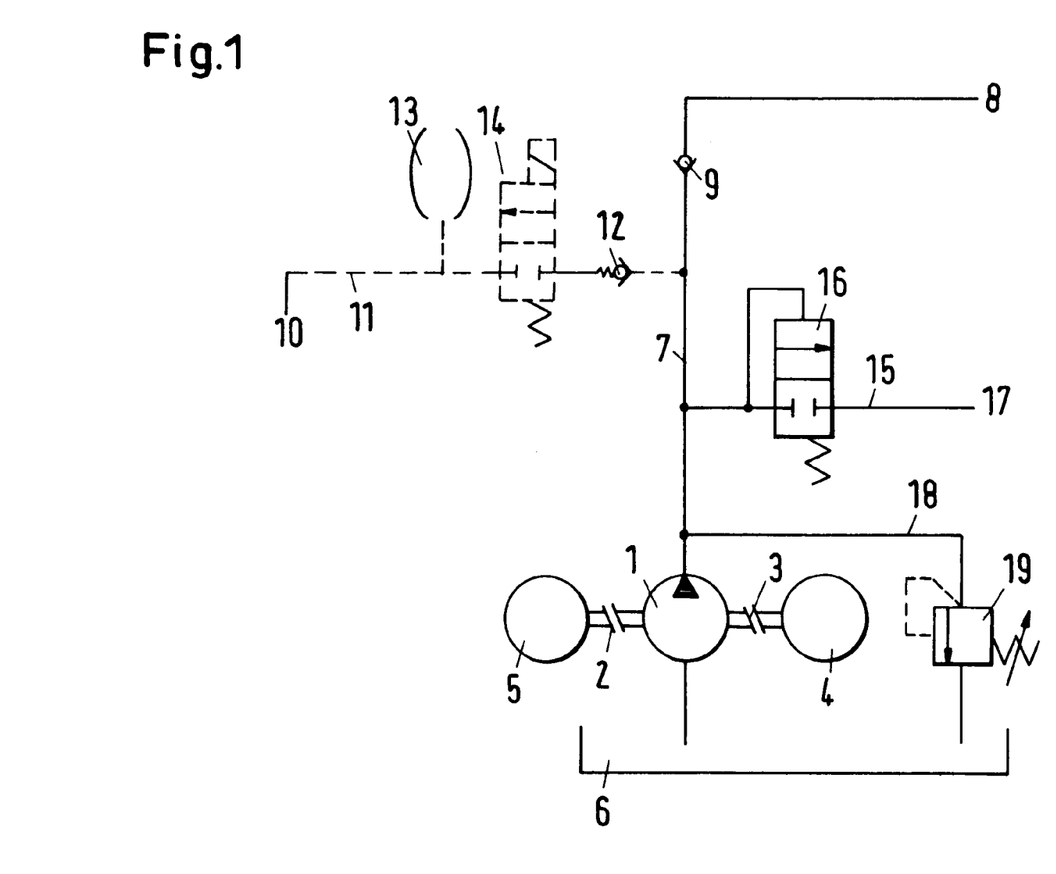
FIG. 1 shows a first embodiment of the control device according to the invention.

The control device according to FIG. 1 has an oil pump 1 which is connected by a clutch 2, 3 with the engine 4 of the motor vehicle and an electric motor 5, respectively. The oil which is pumped by the oil pump 1 from the tank 6 is conveyed by a pressure line 7 to a camshaft adjuster 8 which is known in the art and is therefore not described in detail in this connection. In the pressure line 7, a check valve 9 is provided which opens in the direction toward the camshaft adjuster 8. The oil which is conveyed via the pressure line 7 serves for supplying oil to the camshaft, in particular, for lubricating the bearings.

Optionally, additional consumers 10 can be connected to the pressure line 7, for example, automatic transmissions, power-assisted braking devices and the like. The consumer(s) 10 is/are connected by line 11 to the pressure line 7. In the line 11, a check valve 12 which closes in the direction toward the pressure line 7 is provided. An oil reservoir 13 and a connect valve are connected to the line 11. The connect valve 14 can connect or direct the supply of oil conveyed by the oil pump 1 to the additional consumer(s) 10.

In the shown embodiment, in the area between the oil pump 1 and the line 11, an additional line 15 is connected to the pressure line 7 in which a pressure connect valve 16 is positioned with which the supply of oil pumped by the oil pump 1 is directed to the crankshaft 17. The pressure connect valve 16 is embodied such that the oil flowing within the pressure line 7 reaches the crankshaft 17 only when a certain pressure is surpassed. The check valve 9 is configured such that initially the oil under pressure is supplied via check valve 9 to the camshaft adjuster 8 and the camshaft so that these components are the first ones supplied with the required oil. As soon as the pressure in the pressure line 7 has reached a higher value, the pressure connect valve 16 is opened so that the oil can flow to the crankshaft 1 via the line 15.

When the ignition of the vehicle is switched on, without the starter being actuated, the electric motor 5 is switched on which drives by means of the clutch 2 the oil pump 1. The clutch 3 between the oil pump 1 and the motor vehicle engine 4 is disengaged at this time so that the oil pump 1 and the motor vehicle engine 4 are free-wheeling. Accordingly, already in the ignition position, the required oil is supplied in the described way via the pressure line 7 to the camshaft adjuster 8 and to the camshaft. When the ignition key is turned farther into the engine starting position, the motor vehicle engine 4 is also driven. As soon as the motor vehicle engine 4 has reached a higher speed than the electric motor 5, the clutch 3 engages so that the oil pump 1, as is known in the art, is now driven by the motor vehicle engine 4. At the same time, the clutch 2 between the oil pump 1 and the electric motor 5 is disengaged (switched to the free-wheeling state). In this way, the oil supply of the camshaft and of the camshaft adjuster is realized in the conventional way.

When the oil supply to the camshaft and the camshaft adjuster 8 is insufficient, the clutch 2 is closed and, in this way, the electric motor 5 is switched on so that the oil pump 1 is brought up to the required speed. It is then possible to supply oil in a sufficient amount to the camshaft and the camshaft adjuster 8. When switching on the electric motor 5, the clutch 3 between the oil pump 1 and the motor vehicle engine 4 is opened (disengaged) or switched to free-wheeling.

In the area between the line 15 and the oil pump 1, a tank line 18 opens into the pressure line 7. A pressure control valve 19 is mounted in the tank line 18. As soon as the pressure in the pressure line 7 has surpassed a given or set value, the pressure control valve 19 opens so that the oil flows back to the tank 6.

With the described control device, the camshaft and camshaft adjuster 8 are already supplied with oil when the motor vehicle engine has not yet been turned on. For supplying the camshaft adjuster 8 as well as optionally additional consumers 10, only a single oil pump 1 is provided. The electric motor 5 is switched on as an auxiliary supply device when the oil cannot be conveyed in sufficient amounts into the pressure line 7.

Figure 2:
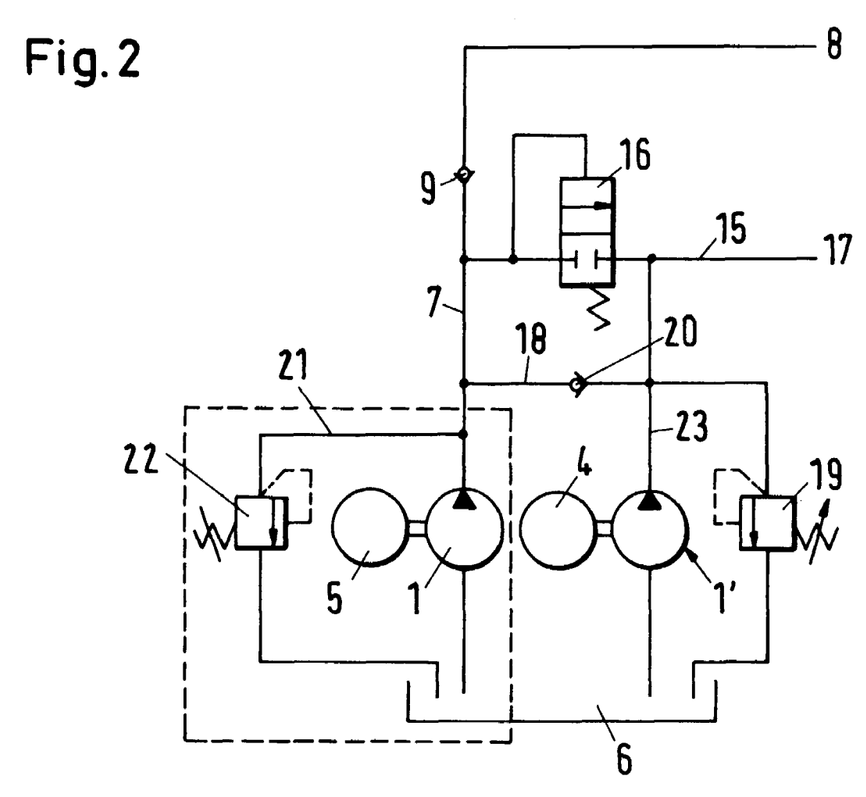
FIG. 2 shows a second embodiment of the control device according to the invention.

The control device according to FIG. 2 has two oil pumps 1, 1'. The oil pump 1' is driven, as is conventional, by the motor vehicle engine 4 and can be of a small size. The oil pump 1 is driven by the electric motor 5. In the ignition position of the ignition key, the electric motor 5, as has been explained in connection with the embodiment of FIG. 1, is turned on so that the oil is conveyed by the oil pump 1 through the pressure line 7 and the check valve 9 to the camshaft adjuster 8 and the camshaft with sufficient pressure. When the ignition key is turned farther into the starting position, the oil pump 1' is driven by the motor vehicle engine 4 as is known in the art. The electric motor 5 is then switched off so that the oil is conveyed exclusively by the oil pump 1 and the line 18 into the pressure line 7. In the line 18, a check valve 20, which opens in the direction of the pressure line 7, is provided which prevents that the oil supplied by the oil pump 1 can flow to the oil pump 1'. The line 15 is connected to the pressure line 7 in the area between the oil pump 1 and the check valve 9. The pressure connect valve 16 is seated in the line 15. The line 15 extends to the crankshaft 17.

In the part of the control device correlated with the electric motor, a line 21 is connected to the pressure line 7 in the area between the line 18 and the oil pump 1. In the line 21 a pressure control valve 22 is mounted which limits the pressure in the pressure line 7 to a predetermined value. When the predetermined value is surpassed, the pressure control valve 22 opens in the direction to the tank 6.

The oil pump 1' is connected by a pressure line 23 to the line 18 as well as to the line 15. The pressure control valve 19 in the line 18 ensures that the pressure in the pressure line 23 is not too high. The pressure line 23 is connected in the area between the pressure connect valve 16 and the crankshaft 17 to the line 15.

Since the oil supply of the camshaft adjuster 8 as well as the camshaft is realized in the ignition position by the electric motor 5, the oil pump 1' can be small. The oil pump 1' is always in operation as long as the motor vehicle engine 4 is running. The oil pump 1' is then driven, as is known in the art, as a function of the engine speed.

In this embodiment, the camshaft adjuster 8 and the camshaft are supplied with oil when the motor vehicle engine 4 is not yet turned on. The oil pump 1 can be switched on as an auxiliary device when the supply of the camshaft adjuster and of the camshaft provided by the oil pump 1' is insufficient. Since the oil pump 1' operates at all times, the camshaft bearing is lubricated as a function of the engine speed so that an optimal wear behavior results.

Figure 6:
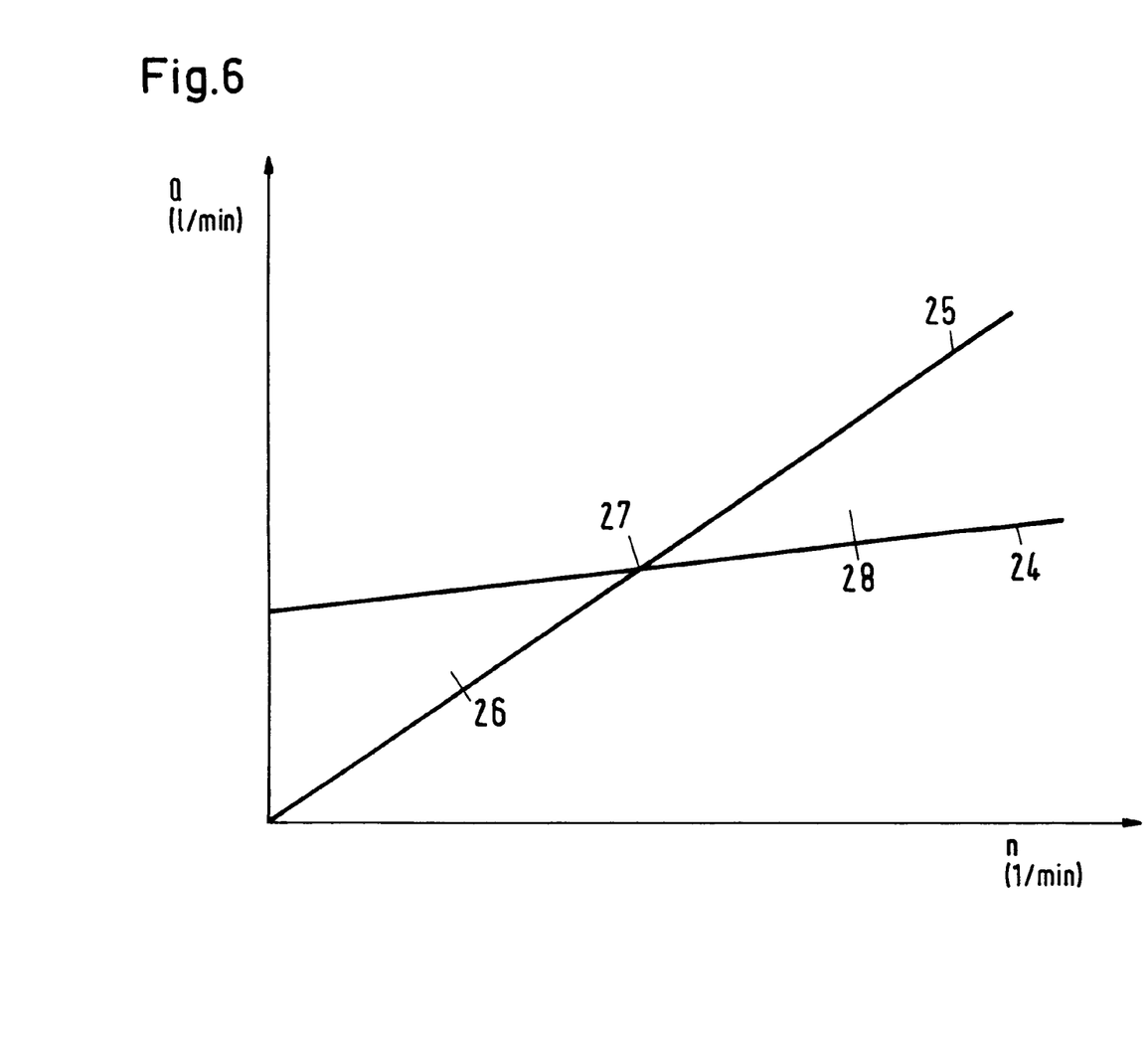
FIG. 6 shows an output flow/engine speed diagram for the oil supply of conventional motors.

In accordance with the preceding embodiment, additional consumers can be connected to the pressure line 7. FIG. 6 shows the oil supply of a conventional motor. In FIG. 6, the output flow of oil is plotted against the engine speed. The line 24 shows the oil demand of the engine. With increasing engine speed of the engine, the oil demand increases. The line 25 in FIG. 6 shows the output flow of the engine oil pump. When the engine is switched off and the engine speed is zero, the oil output flow is also zero. When the engine is turned on, the output flow increases almost linearly with the engine speed. The curve 25 shows a much steeper ascending gradient than the curve 24. The oil demand of the engine (curve 24) has a certain value when the engine is turned off. When the motor vehicle engine is idling, the oil supply of the engine is not sufficient. The curve 24 in the diagram according to FIG. 6 extends in this area above the output flow curve 25. The area 26 between these two curve sections characterizes the range of undersupply. Since at idle speed the oil supply of the engine is insufficient, the bearings of the motor vehicle engine as well as of the camshaft adjuster must be oversized.

With increasing engine speed, the output flow curve 25 intercepts at the point of interception 27 the oil demand curve 24. At this point of interception 27, the oil supply of the engine is sufficient. Since however the output flow curve 25 with increasing engine speed ascends more steeply than the oil demand curve 24, an oil oversupply is provided at higher engine speed in the range 28 above the point of interception 27. This represents an output loss because such an oil oversupply would not be necessary for a satisfactory oil supply of the engine.

Figure 7:
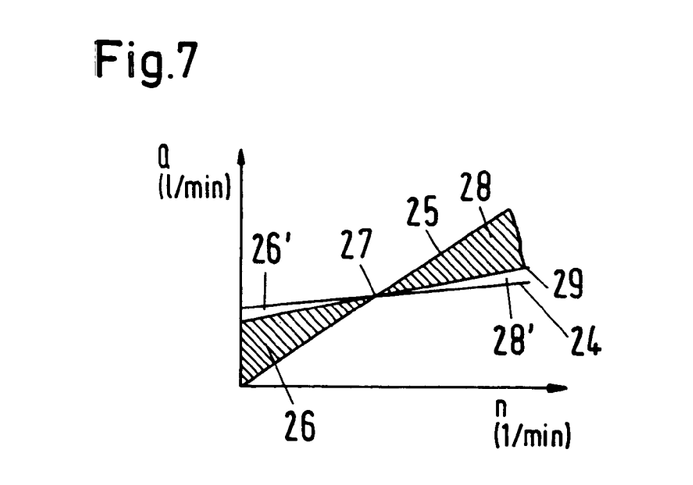
FIG. 7 shows the output flow/engine speed diagram for the control device according to the invention in accordance with FIGS. 1 and 2.

The control devices according to FIGS. 1 and 2 have an output flow/engine speed diagram as illustrated in FIG. 7. In FIG. 7, the undersupply and oversupply ranges 26, 28 provided for conventional engines are identified by cross-hatching. Since in the control devices according to FIGS. 1 and 2 the oil pumps 1, 1' are already switched on when the motor vehicle engine 4 has not yet been started, the output flow curve 29 extends significantly flatter than in the case of conventional engines (FIG. 6). In particular, the output flow curve 29 does not extend through the origin of coordinates of the output flow/engine speed diagram. As illustrated in FIG. 7, the output flow curve 29 extends significantly flatter than the output flow curve 25 for the known engines. Accordingly, the areas 26', 28' are significantly smaller than in the known embodiments. The control devices of FIGS. 1 and 2 can be configured such that the two curves 24, 29 coincide so that the output loss is zero. In particular in the engine speed range below the point of interception 27 of the two curves 24, 29 an oil undersupply can be reliably prevented. In this way, for example, the bearings of the camshaft adjuster 8 and other components to be supplied with oil can be made smaller. In particular, they must no longer be oversized. The service life of the bearings is increased significantly in this way.

Figure 3:
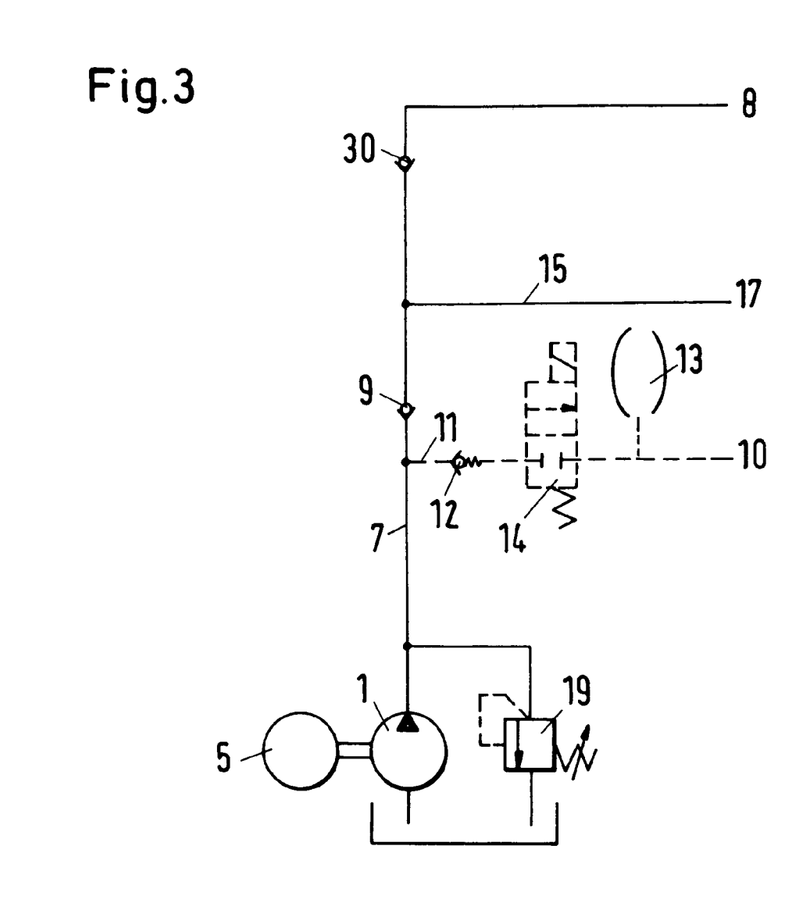
FIG. 3 shows a third embodiment of the control device according to the invention.

The control device according to FIG. 3 has in accordance with the embodiment of FIG. 1 only a single oil pump 1 which is driven by the electric motor 5. Via the pressure line 7 the camshaft adjuster 8 as well as the camshaft are supplied with the required amount of oil. In the area between the oil pump 1 and the check valve 9, a line 11 is connected to the pressure line 7 for connecting at least one additional consumer 10. In line 11 a check valve 12 closing in the direction toward the pressure line 7, an oil storage device 13, and a switching valve 14 are mounted. The valve 14 is located in the area between the check valve 12 and the storage device 13.

In the flow direction of the oil in the pressure line 7, an additional check valve 30 is provided behind the check valve 9 and closes, like the check valve 9, in the direction toward the oil pump 1. Between the two check valves 9, 30, the line 15 is connected to the pressure line 7. The line 15 can supply the crankshaft 17 with oil.

The camshaft adjuster 8 and the camshaft are arranged downstream of the check valve 30 in the flow direction of the oil.

The pressure in the pressure line 7 is determined by the pressure control valve 19.

In this embodiment, an oil pump driven by the motor vehicle engine is not provided. The electric motor 5 is configured with respect to its output such that the required oil supply for the individual components is ensured. The electric motor 5 is actuated, in accordance with the preceding embodiments, already in the ignition position of the ignition key so that, before starting the motor vehicle engine, the camshaft adjuster 8, the camshaft, and the crankshaft 17 as well as optionally present additional consumers 10 are supplied with the required oil. As in the embodiment of FIG. 2, an optimal efficiency as well as an optimal wear behavior of the bearings result. It is also possible to employ materials with reduced strength because the components to be lubricated are supplied already before starting the engine with the required oil.

Figure 8:
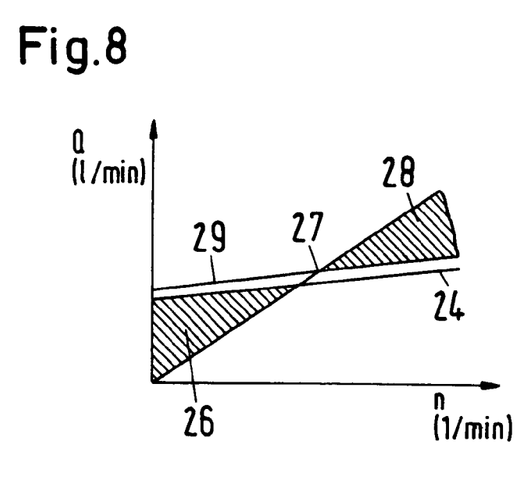
FIG. 8 shows the output flow/engine speed diagram for the control device according to FIG. 3.

The output flow/engine speed diagram according to FIG. 8 is correlated with the embodiment of FIG. 3. The undersupply and the oversupply areas 26, 28 of conventional engines are illustrated by cross-hatching. The output flow curve 29 of the embodiment according to FIG. 3, in comparison to the control devices of FIGS. 1 and 2, is displaced to higher output flow values. The areas between the curve 29 and the oil demand curve 24 of the engine are minimized so that, as in the preceding embodiments, an undersupply of oil at engine speeds under the point of interception 27 is prevented; the oversupply of oil at higher engine speeds is also prevented or is present only to a minimal extent.

Figure 4:
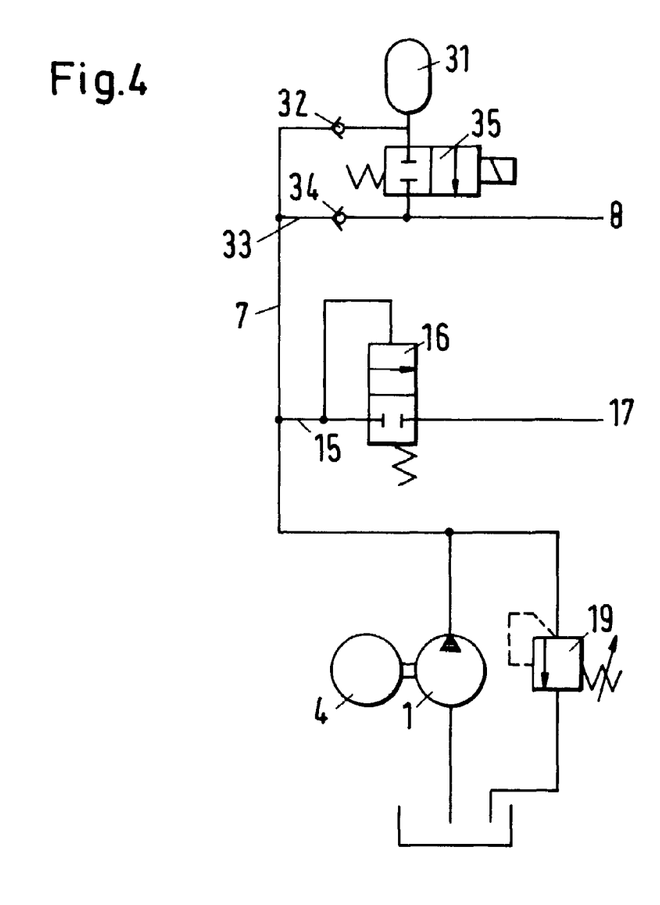
FIG. 4 shows a fourth embodiment of the control device according to the invention.

The control device according to FIG. 4 has a single oil pump 1 which is actuated exclusively by the motor vehicle engine 4. In contrast to the preceding embodiments, making available the auxiliary oil is not realized by an electric motor but by an auxiliary storage device 31. It is secured relative to the pressure line 7 by a check valve 32. Line 15 branches off the pressure line 7. In the line 15 the pressure connect valve 16 is positioned. The line 15 extends to the crankshaft 1 7.

A line 33 is also connected to the pressure line 7. A check valve 34 is mounted in the line 33 and closes in the direction toward the pressure line 7. In order for the oil present within the auxiliary storage device 31 to be available for use, the auxiliary storage device 31 is connected to a valve 35.

The pressure in the pressure line 7 is limited by the pressure control valve 19.

In the ignition position of the ignition key, the valve 35 is opened so that the oil in the auxiliary storage device 31 can flow to the camshaft adjuster 8 as well as to the camshaft. As soon as the engine has been turned on and the pressure line 7 has built up a corresponding pressure, the pressure connect valve 16 is opened so that the oil can flow via the line 15 to the crankshaft 17. Moreover, the oil can flow via the line 33 and the check valve 34 to the camshaft adjuster as well as the camshaft.

Figure 5:
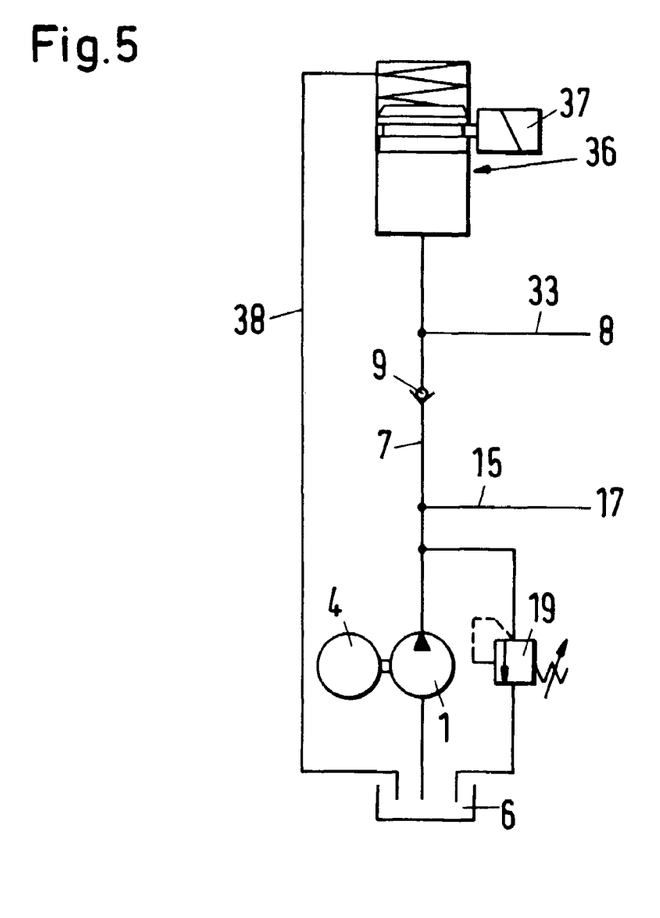
FIG. 5 shows a fifth embodiment of the control device according to the invention.

The control device according to FIG. 5 corresponds substantially to the embodiment according to FIG. 4. Instead of the auxiliary storage device 31 the control device of FIG. 5 is provided with a piston storage device 36 which can be locked by a solenoid 37. When the ignition key is turned into the ignition position, the electric solenoid 37 is excited such that the piston storage device 36 is released. The storage device 36 can then convey the oil contained therein via the line 33 to the camshaft adjuster 8 and to the camshaft. The piston storage device 36 is connected to the pressure line 7 in which the check valve 9 closing in the direction toward the oil pump 1 is positioned. The line 33 branches off in the area between the check valve 9 and the piston storage device 36. In the area between the oil pump 1 and the check valve 9, the line 15 extending to the crankshaft 17 is connected to the pressure line 7. In accordance with the preceding embodiments, the pressure control valve 19 limits the pressure of the oil in the pressure control line 7.

A venting line 38 is connected to the piston storage device 36.

After the pressurized oil is supplied via the line 33 to the camshaft adjuster 8 and the cam shaft upon release of the piston storage device 36, the oil pump 1 is switched on when the engine 4 is started and conveys the required oil via the line 15 to the crankshaft 17. Moreover, the pressurized oil is also conveyed via the check valve 9 into the line 33. In accordance with the preceding embodiments, the pressure of the oil in the pressure line 7 is so great that the piston storage device 36 is again filled with oil.

Figure 9:
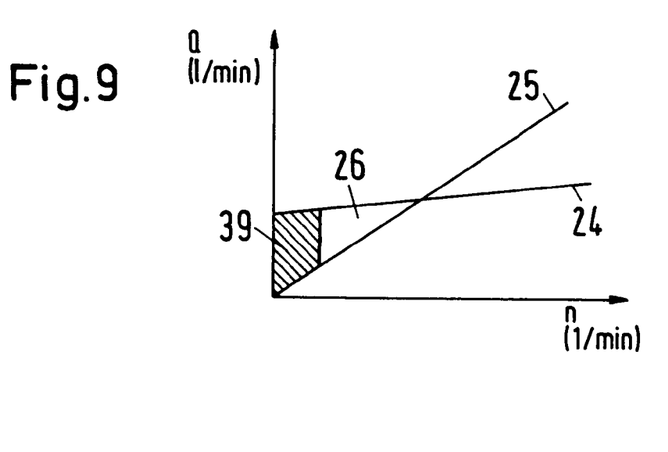
FIG. 9 shows an output flow/engine speed diagram for the control device according to FIGS. 4 and 5.

FIG. 9 shows the output flow/engine speed diagram for the control devices according to FIG. 4 and 5. The curve 25 characterizes the output flow of the oil pump 1 while the curve 24 shows the oil demand of the engine. The curve 25 extends through the origin of the coordinates of the diagram. The cross-hatched area 39 of FIG. 9 illustrates the storage volume of the auxiliary storage device 31 (FIG. 4) and of the piston storage device 36 (FIG. 5), respectively. In this way, the undersupply area 26, in comparison to conventional engines (FIG. 6), is significantly reduced.

Figure 10:
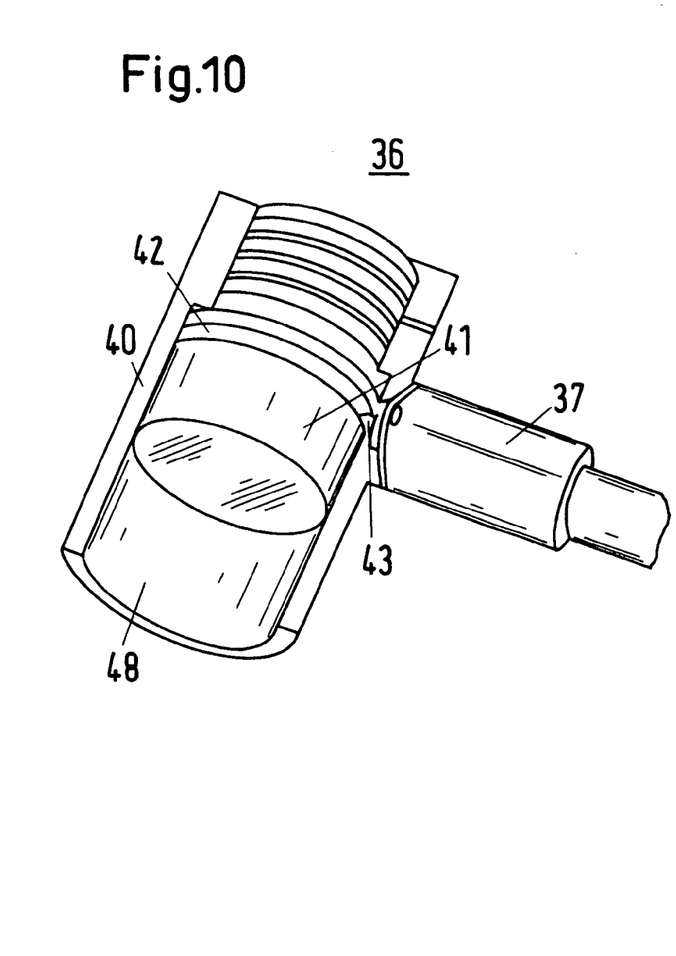
FIG. 10 shows an electromagnetically releasable piston storage device of the control device according to FIG. 5, partially in section.
Figure 11:
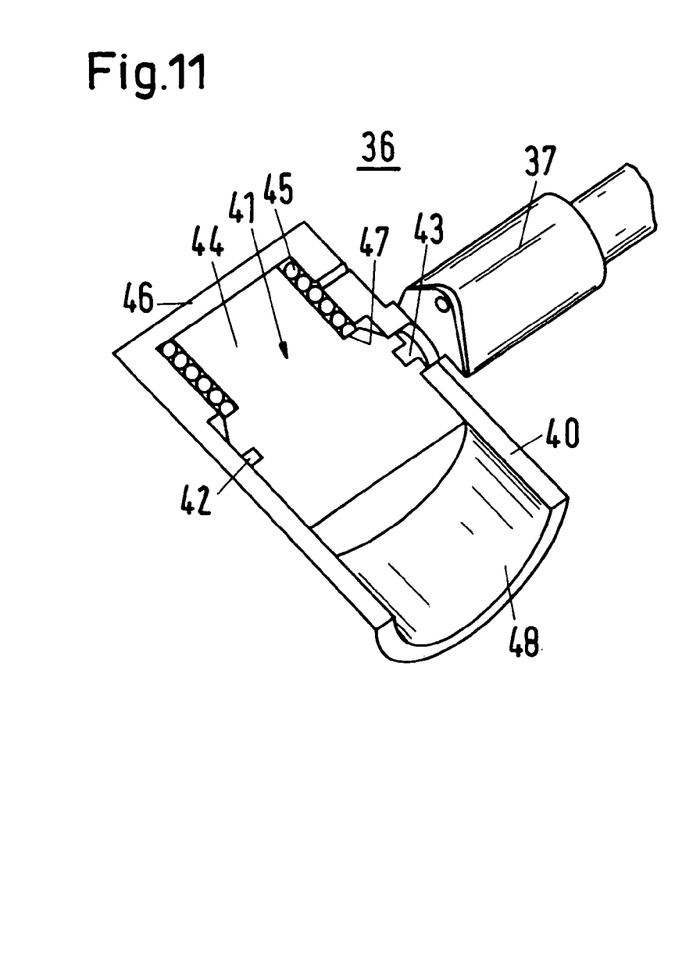
FIG. 11 shows the piston storage device according to FIG. 10 in axial section.

The piston storage device 36 has, as illustrated in FIGS. 10 and 11, a cylindrical housing 40 in which a piston 41 is movably supported. It is provided on its periphery with an annular groove 42 which can be engaged by a plunger 43 of the solenoid 37. By means of the plunger 43 engaging the annular groove 42, the piston is locked in its initial position.

The piston 41 has a projection 44 having a reduced diameter that is surrounded by a pressure coil spring 45. It is supported with one end on the bottom 46 of the housing 40 and with the other end on a radial shoulder surface 47 of the piston 41. The piston 41 delimits on the side facing away from the projection 44 a storage space 48 in which the oil is contained and into which the pressure line 7 opens (FIG. 5).

When the solenoid 37 is switched on, the plunger 43 is retracted and the piston 41 is released. The pressure coil spring 45 is configured such that it moves the piston 41 which displaces the oil contained in the storage chamber 48 into the line 33 (FIG. 5) toward the camshaft adjuster 8 and the camshaft. As soon as the motor vehicle engine 4 is turned on and the oil pump 1 begins to operate, the oil pump 1 conveys oil from the tank 6 via the pressure line 7 into the storage chamber 48. The pressure in the pressure line 7 is greater than the counteracting pressure of the spring 45 so that the piston is returned into the position illustrated in FIGS. 10 and 11 in which it rests advantageously with the projection 44 against the housing bottom 46. The solenoid 37 is switched such that the plunger 43 engages the annular groove 42 of the piston 41 and secures it in the initial position.

The described control devices ensure that the camshaft already before starting the motor vehicle engine is returned into a defined initial or starting position so that upon subsequent starting of the engine the camshaft adjuster can operate properly. Since the motor vehicle engine 4 is switched on only once the control device has supplied oil to the camshaft adjuster 8 and the camshaft as well as optionally also to the crankshaft 17, a problem-free operation is ensured. The control devices can be used not only for internal combustion engines but also for automatic transmissions. As a result of the described fast oil pressure build-up, the automatic transmissions provide a quick response.

While specific embodiments of the invention have been shown and described in detail to illustrate the inventive principles, it will be understood that the invention may be embodied otherwise without departing from such principles.

What is claimed is:

1. A control device for at least one consumer of a motor vehicle having an engine, the control device comprising:
   at least one pump for supplying a medium via at least one pressure line to the at least one consumer, wherein the control device is configured to supply the medium to the at least one consumer before the engine is started;
   an electric motor connected to the at least one pump for driving the at least one pump and a first clutch connected to the electric motor and the at least one pump and configured to couple the electric motor and the at least one pump;
   a second clutch connected to the engine and the at least one pump and configured to couple the engine and the at least one pump after the engine has been started;
   wherein, when a supply of medium to the at least one consumer generated by the engine is insufficient during operation of the engine, the first clutch engages the electric motor and the second clutch disengages the engine such that the electric motor drives the at least one pump until the supply of medium to the at least one consumer is sufficient.

2. A control device for at least one consumer of a motor vehicle having an engine, the control device comprising;
   at least one pump for supplying a medium via at least one pressure line to the at least one consumer, wherein the control device is configured to supply the medium to the at least one consumer before the engine is started;
   an electric motor switched on by the ignition of the motor vehicle and connected to the at least one pump for driving the at least one pump;
   a clutch connected to the electric motor and the at least one pump and configured to couple the electric motor and the at least one pump;
   wherein the at least one pump is driven by the engine after the engine has been started and wherein an output flow of oil generated by the at least one pump is matched at least substantially to an oil demand of the engine at any engine speed by disengaging the engine from the at least one oil pump and driving the at least one pump by the electric motor until undersupply and oversupply of oil is reduced.

3. The control device according to claim 1, wherein the at least one pump is driven such that an output flow of oil generated by the at least one pump matches at least substantially an oil demand of the engine at any engine speed to reduce undersupply and oversupply of oil.

* * * * *